United States Patent [19]
Yamagami et al.

[11] Patent Number: 5,311,491
[45] Date of Patent: May 10, 1994

[54] METHOD OF DATA RECORDING FOR OPTICAL DISC HAVING BURST MODULATED TRACK

[75] Inventors: Tamotsu Yamagami, Kanagawa; Yoichiro Sako, Chiba, both of Japan

[73] Assignee: Sony Corporation, Tokyo, Japan

[21] Appl. No.: 585,177

[22] Filed: Sep. 20, 1990

[30] Foreign Application Priority Data

Sep. 22, 1989 [JP] Japan .................................. 1-247833
Jan. 30, 1990 [JP] Japan .................................. 2-020087

[51] Int. Cl.⁵ ................................................ G11B 5/09
[52] U.S. Cl. ......................................... 369/47; 319/54; 319/58; 319/59
[58] Field of Search ................................ 369/47-58, 369/44.26, 32, 275.1-275.4, 44.13, 44.14, 13; 360/77.04-77.12, 131, 134, 135, 114, 59

[56] References Cited

U.S. PATENT DOCUMENTS

| | | |
|---|---|---|
| 4,375,088 | 2/1983 | de Haan et al. ............... 369/111 |
| 4,424,543 | 1/1984 | Lewis et al. ................ 360/77.08 |
| 4,513,331 | 4/1985 | Baker et al. ................ 360/77.07 |
| 4,530,019 | 7/1985 | Penniman .................... 360/135 |
| 4,669,004 | 5/1987 | Moon et al. .................. 369/48 |
| 4,682,253 | 7/1987 | Leslie ....................... 360/77.07 |
| 4,716,560 | 12/1987 | Itonaga ..................... 369/275.3 |
| 4,815,064 | 3/1989 | Melbye ..................... 369/44.13 |
| 4,910,617 | 3/1990 | Brunnett et al. ............ 360/77.05 |
| 4,931,888 | 6/1990 | Taguchi et al. ............. 360/77.04 |

FOREIGN PATENT DOCUMENTS

| | | | |
|---|---|---|---|
| 0007200 | 1/1980 | European Pat. Off. ........ | G11B 7/00 |
| 0265695 | 5/1988 | European Pat. Off. ........ | G11B 7/09 |
| 0299573 | 1/1989 | European Pat. Off. ... | G11B 07/013 |
| 0325329 | 7/1989 | European Pat. Off. ..... | G11B 27/30 |
| 0326206 | 8/1989 | European Pat. Off. ..... | G11B 27/30 |
| 0158045 | 7/1986 | Japan ....................... | 369/44.14 |
| 0241725 | 10/1988 | Japan ....................... | 369/275.3 |
| 2067313 | 7/1981 | United Kingdom ........... | G11B 7/08 |

Primary Examiner—Aristotelis Psitos
Assistant Examiner—Thang V. Tran
Attorney, Agent, or Firm—Lewis H. Eslinger; Jay H. Maioli

[57] ABSTRACT

A method of recording information is provided, in which a first signal is recorded along the length of a recording track previously formed on a recording medium. On the recording track, a second signal is prerecorded by offsetting the track along its width. During the recording of the first signal, the points of transition of the first signal are positioned so as to be spaced apart from, and therefore unaffected by, the points of transition of the second signal. Also, by including a clock synchronization signal in the first signal, PLL capture may be achieved accurately in a shorter time. In addition, the unit of phase shift between the channel clock of the first signal and the channel clock of the second signal is set to be shorter than the channel clock bit. A data recording method and an optical data recording method are also provided, which may be suitably applied to a magneto-optical disc or the like. The data are previously modulated by a modulation system satisfying a predetermined rule of modulation and include connection bits between adjacent units of the modulated data by way of further modulation. Control information is recorded by offsetting the track along its width, while the points of transition of the track along its width coincide with the recording region for the connecting bits, since the latter are not part of the main signal information.

8 Claims, 5 Drawing Sheets

METHOD OF DATA RECORDING FOR OPTICAL DISC HAVING BURST MODULATED TRACK

BACKGROUND OF THE INVENTION

1. Field of the Invention

This invention relates to an information recording method and an optical recording medium. More particularly, it relates to an information recording method and an optical recording medium in which secondary or subsidiary signals are prerecorded on a recording track by offsetting the track in a direction parallel to the track width. More particularly still, it relates to an information recording method and an optical recording medium in which the adverse effects which the signals produced by this offsetting of the recording track might have on the main signals recorded on the recording track are eliminated.

2. Description of the Prior Art

It is known in the prior art to form a guide groove or pregroove or grooves in a spiral or concentric pattern on an optical recording medium, such as a magneto-optical disc, and to record or reproduce data on or from a recording track along the track length, using the photo-magnetic effect, which recording track coincides with the previously formed guide groove or pregroove or the land between the grooves.

Specifically, it is known to record data and control information, such as sync signals or addresses, on the recording track alternately and to perform data control on the basis of the control information. It is with the aid of the control information that the data are recorded or reproduced on a block-by-block or sector-by-sector basis.

Japanese patent publication No. 63-87682/1988 discloses a technique in which a wobbling track for detecting tracking errors is recorded after frequency modulation by a time code. With this technique, a sinusoidal carrier signal having a frequency of, for example, 22.05 kHz is frequency modulated by a time code signal of a frequency which is low enough as compared to that of the carrier to form the wobbling track, so that, during reproduction, a tracking error signal may be produced from the wobbling track, while the time code signal is demodulated to produce a time code as position information. However, with this prior art technique, clocking of the signals recorded on the track cannot be achieved with the track wobbling signal. A unit of time information data at most may be inserted in one block with the wobbling signal, and this reduces the extraction accuracy. In addition, decoding cannot be achieved unless one complete block is read out so that correct position matching cannot be achieved without difficulty.

In order to reproduce the main information recorded on the recording track along the track length, in the form for example of magneto-optical signals or Mo signals, it is known to provide a long preamble region for clock reproduction or clocking at the leading end of the main information and to extract clocks for reproducing the MO signals from the signals written in the preamble region. However, the data recording capacity is decreased in this case by an amount corresponding to the length of the preamble region.

To overcome these problems, the present inventors have already proposed a method which consists in pre-recording the control information, such as frame sync signals or addresses, by offsetting the recording track along its width (i.e., in a direction parallel to its width), reproducing the control information, and using the reproduced control information as frame sync signals or addresses for recording or reproducing the main signals or main information. The present inventors have already proposed a method for reducing the length of the preamble region by employing the prerecorded frame sync signals in the form of track offsets along the track width as the frequency capturing signals at the PLL and using the signals recorded on the recording track for phase capture at the PLL.

Unfortunately, the signals as heretofore recorded in the form of track offsets along the track width affect the main signals recorded on the recording track. Specifically, during phase capture of the PLL, the points of transition or edges of the signals recorded in the form of track offsets along the track width may interfere with and affect the main signals recorded on the track to produce jitter in the reproduced clocks.

OBJECTS AND SUMMARY OF THE INVENTION

It is therefore an object of the present invention to provide a signal recording method for eliminating the adverse effects of the secondary signals recorded by offsetting the main recording track in a direction parallel to its width direction.

Another object of the invention is to provide a method wherein clock capture of the main signals recorded on the track may be performed in a short time and with high accuracy.

Another object of the invention is to provide an optical recording medium for recording and reproducing main and secondary signals as described above without interference.

In accordance with a first aspect of the invention, there is provided a method of recording information comprising the steps of preforming on an optical recording medium a recording track which is elongate in a length direction and has offsets at intervals in a width direction perpendicular to the length direction, recording a first information signal along the length direction of the recording track, there being points of transition between successive portions of the first information signal, wherein the offsets of the recording track constitute points of transition of a second information signal and further comprising the step of arranging the points of transition of the first information signal so that they are spaced apart from the points of transition of the second information signal.

In accordance with an independent aspect of the invention, there is provided a method of recording information comprising the steps of preforming on an optical recording medium a recording track which is elongate in a length direction and has offsets at intervals in a width direction perpendicular to the length direction, recording a first information signal along the length direction of the recording track; modulating the first information signal and employing in the modulation redundant bits at spaced apart regions so as to satisfy a predetermined modulation rule, wherein the offsets of the recording track constitute points of transition of a second information signal and further comprising the step of arranging said spaced apart regions so that they include the points of transition of the second signals.

In accordance with another independent aspect of the invention, there is provided an optical recording medium carrying recorded data which are read by optical means, said optical recording medium comprising a preformed recording track which is elongate in a length direction and has offsets at intervals in a width direction perpendicular to the length direction, a recordable region in the track; a first signal recorded along the track length in the recordable region, said first signal being modulated in modulation units having a predetermined period and a maximum transition interval to satisfy a predetermined modulation rule and including redundancy bits between consecutive units of modulated dots, by way of further modulation, periodic signals having a period bearing an integer ratio to said predetermined period, and a sync signal which is constituted by said offsets and undergoes a transition at an interval longer than the period of said periodic signals, said interval being a predetermined integer multiple of said maximum transition interval.

The present invention thus provides a signal recording method for recording a first signal on a recording track previously formed on the recording track, along the length of the track, wherein a second signal is previously recorded by offsetting the track along its width, and wherein the first signal is recorded in such a manner that points of transition or change of the first signal are not superimposed on the point of transition or change of the second signal.

The first signal may include the clock for capturing the clock of the first signal into synchronization.

The unit phase shifts between the channel clock of the first signal and the channel clock of the second signal may be selected to have a duration less than the channel clock bit duration.

If the first signal is obtained by modulating data in accordance with a predetermined rule of modulation and redundancy bits are introduced between units of the modulated data for further modulation, it suffices if the control information is recorded by offsetting the track along its width and the points of track transition (track offset) along the track width are superimposed on the recording region for the connecting bits.

The recording medium of the present invention also is provided with a track portion modulated or offset along its width at a repetitive period matched to the length of the modulation unit plus the connecting bits, and a track portion of the sync region modulated or offset along its width at a period equal to a predetermined integer multiple of the maximum transition distance and longer than the aforementioned repetitive period.

With the signal recording method of the present invention, when the information or data is to be recorded on or reproduced from a magneto-optical disc, for example, and, to this end, frequency capture by offsetting the track along its width or phase capture by control signals such as clock sync signals recorded on the track is to be performed at the PLL, it becomes possible to eliminate the adverse effects which the signals recorded by offsetting the track along its width might have on the phase capture by the PLL.

On the other hand, in the recording medium of the present invention, the connecting bits recorded on the track may coincide with the transition points along the track width, since these connecting bits have no pertinence to the recorded data and hence are not affected by the transition along the track width at the time of reproduction.

Also, with the recording medium of the present invention, the track portion of the sync region offset at a period equal to a predetermined integer multiple of the maximum transition distance and longer than the repetitive period is provided for optimum signal reproduction through the detection of such offset track portion.

DESCRIPTION OF THE PREFERRED EMBODIMENTS

Figure 1:
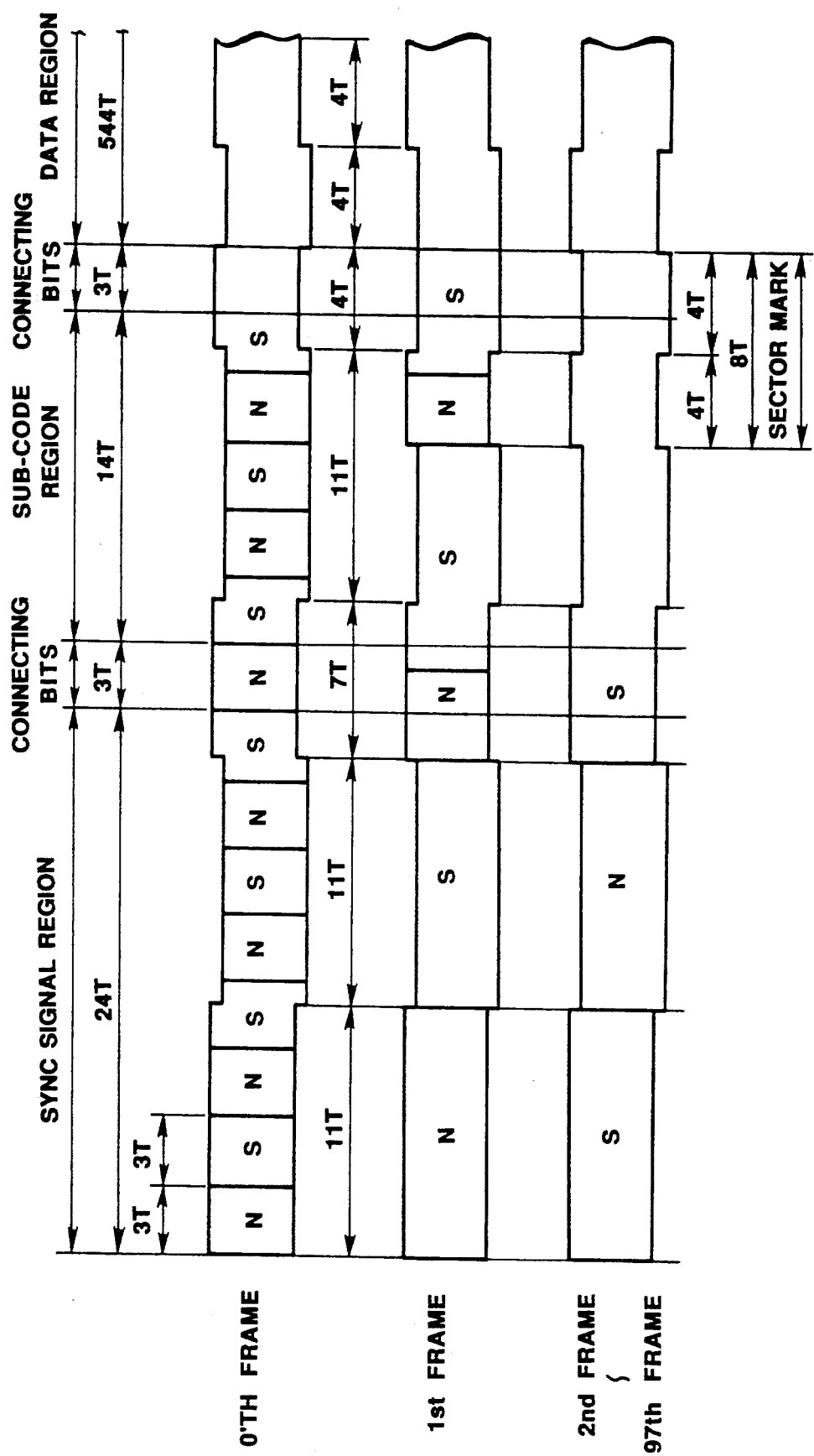
FIG. 1 is a schematic diagram showing a recording format for an information recording method according to a first preferred embodiment of the present invention.

By referring to the drawings, certain preferred embodiments of the present invention will be explained in detail.

FIG. 1 shows the format of the recording track of a magneto-optical disc formed in accordance with a preferred embodiment of the data recording method of the present invention. The recording track may be formed as a spiral or as a concentric circle. FIG. 1 also shows data recorded as a track offset or wobble in a direction perpendicular to the track length or parallel to the track width. The magneto-optical disc employed in the present illustrative embodiment comprises a transparent substrate on which is formed a vertical magnetization film exhibiting magneto-optical effects. On this magneto-optical disc, a guide groove or grooves for tracking are formed in advance in a spiral or concentric pattern as a so-called pregroove or pregrooves. The pregroove or pregrooves or the land or lands therebetween function as the recording track. On this recording track, read-only baseband signals containing subsidiary data, including at least control signals such as sync and clock signals, are recorded by offsetting the track in a direction parallel to the track width. This is sometimes referred to as a deviation or modulation along the track width.

When the main information is to be recorded along the track length on the recording track, on which the signals of the subsidiary data are previously formed by the offset, deviation or modulation referred to above, the main information is recorded in accordance with the present invention so that points of change or transition of the main information signals are not coincident with (i.e., are spaced apart from) the points of change or transition of the signals previously recorded by the offset.

In FIG. 1, a so-called CD format (compact disc format) is used as a concrete example of a format for the data recorded by track wobbling or offsetting along the track width. Each block or sector constituting a data recording unit is formed by 98 frames, namely, 0'th to 97th frames, each frame having a length equal to 588 times the channel clock bit period T (channel clock bit width) or 588T. Each frame has recording regions for a sync signal of length 24T, a sub-code signal of length 14T, a data signal of length 544T including the parity, and two sets of connecting bits each of length 3T used for interconnecting these regions.

In the sync signal region, there are arranged frame sync signals of the CD format, that is two successive 11T transition distances, followed by, for example, 7T, 11T (=7T+4T) and 4T transition distances, to complete 44T transitions at the leading end of each frame inclusive of the above mentioned 22T frame sync pattern. While these frame sync signals are used for frame synchronization, the 8T transition interval at the terminal end of the leading 44T transition distance may also be used as the sector or block mark for block synchronization. The leading frame of the block may be distinguished from the remaining frames by writing, for example, a signal rising at the center of the 8T transition interval, that is "0" of the so-called phase encoding (PE) system, as the sector mark of the leading frame or the 0'th frame at the leading end of the block, and by writing "1" in the remaining sector marks.

In the 554T data region of the 588T or 588 channel bit region of each frame (i.e., in the region other than the aforementioned 44T region at the leading end of the frame), subsidiary data, such as address data, may be recorded by offsetting the track along its width. In this case, the offset clock has a period equal to an integer times the channel clock period T of the main information. For example, the offset clock may have a period equal to 8T. A PE system, a so-called biphase mark modulation system, or an EFM (eight-to-fourteen modulation) system may be employed as the modulation system for recording by offsetting the track along its width.

When performing recording by offsetting the track along its width by the above mentioned PE system using the 8T offset clock as the reference, 544/8 or 68 bit data may be recorded in the 544T data region. When addresses are recorded as the 68-bits-per-frame data, it may be contemplated to use 8 bits corresponding to two decimal digits in the BCD representation in each address of the minute, second and block in accordance with the aforementioned CD format. If two bits are used in the sector mark and eight bits are used for each of the minute address, second address, block address and the frame address, the number of bits is 2+8×4=34 bits. If these 34-bit address data are followed by the inverted address data, the total number of bits is 68.

A concrete example of the recording format for main data recorded along the length of the recording track, on which subsidiary data, such as sync signals, have been recorded by offsetting the track itself along its width, is a recording format similar to that of the compact disc (CD). As FIG. 1 shows, each block or sector as the information recording unit is constituted by 98 frames of 0'th to 97th frames, each frame being 588 times the channel block period or channel block bit width T, or 588T. Each frame includes recording regions for sync signals, sub-code and data inclusive of parity data.

More specifically, there are provided, at the leading end of each frame, a 24 channel bit or 24T sync signal region and a 14T sub-code region, each followed by 3T connecting bits. In the remaining 544T data region, there are provided 32 symbol or 32 byte sample data and parity data which have been modulated by so-called eight-to-fourteen or EFM modulation. In the 24T sync signal region, 3T connecting bits and the 14T sub-code region of the 0'th frame, which is the leading frame of each block, there is a pattern consisting of 13 consecutive occurrences of 3T transition distances. This pattern serves as the clock phase capturing signal at the time of recording and reproduction. In the 24T sync signal region of each of the 1st 97th frames, there are recorded two consecutive occurrences of 11T transition distances. This pattern of the two consecutive occurrences of the 11T transition distances is a so-called out-of-rule pattern which is used in the aforementioned EFM system and hence may be used for frame synchronization.

As noted above, the 11T, 11T, 7T, 11T (=7T+4T) and 4T transition intervals of the signals are recorded by offsetting the track along its width. Now consider the transition interval nT of the clock phase capturing sync signals, recorded along the track length on the recording track of the 0'th frame. The integer times nT are such that they are not equal to 11T, 22T (=11T+11T), 29T (=22T+7T), 40 (=29T+11T) or to 44T (=40T+4T). Specifically, by selecting n to be equal to 3, as in the above mentioned concrete example, it becomes possible to avoid the situation in which the point of change or transition of the signal recorded by offsetting the track along its length is coincident with the point of change or transition of the main signal recorded on the recording track.

It is noted that the inversion distance of the clock phase capturing sync signals recorded along the track width may be selected to be a multiple of some integer other than 3, for example 4, for which the points of track transition along the track width are not coincident with those of the phase capturing sync signals. By avoiding the situation in which the point of change or transition of the secondary or subsidiary signal recorded by offsetting the track along its width becomes coincident with the point of change or transition of the main signal recorded on the recording track, it becomes possible to eliminate the adverse effect which the signal recorded by offsetting the track along its width might have on the PLL phase capturing, as will be explained later.

Figures 2, 3:
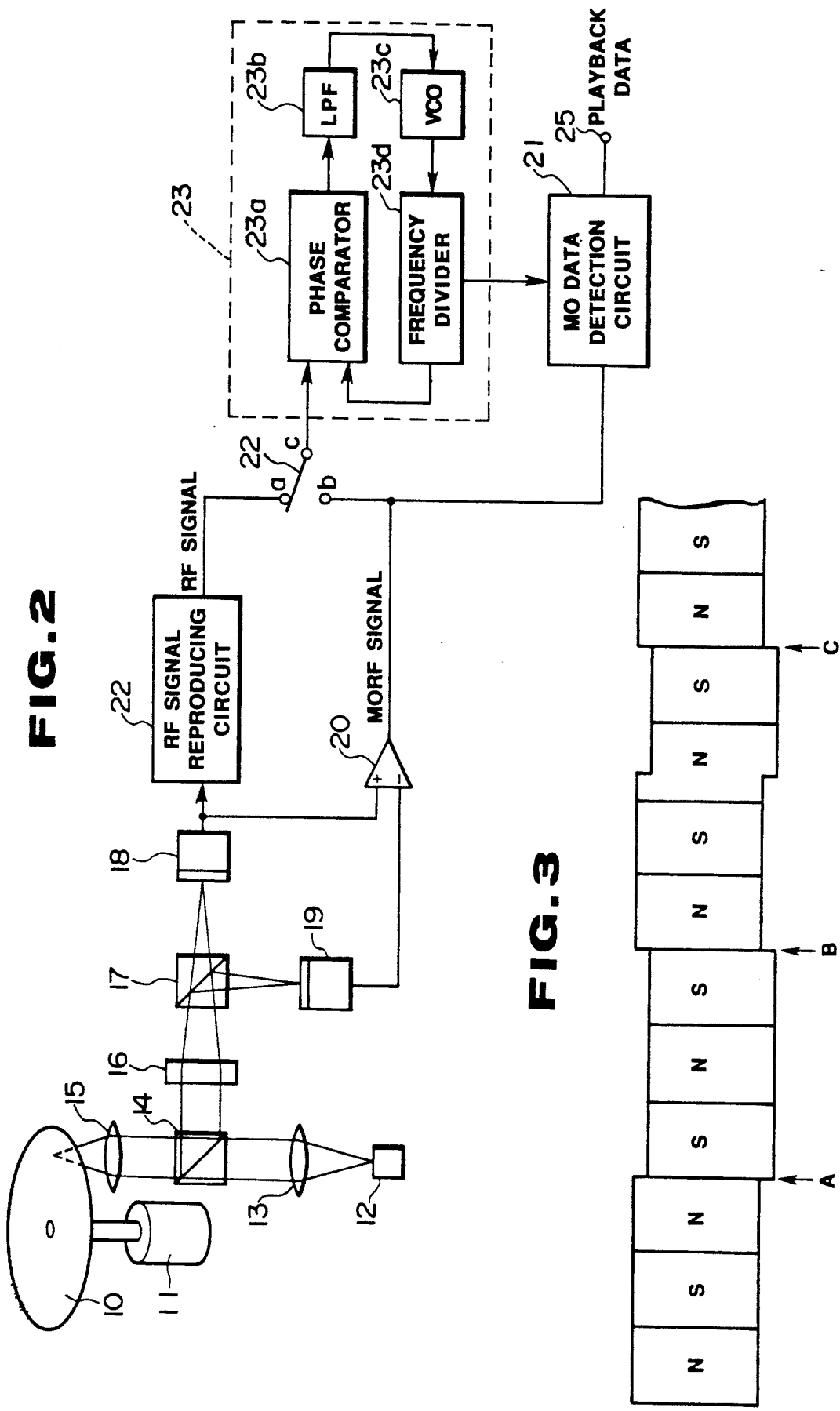
FIG. 2 is a block circuit diagram showing an example of a signal reproducing apparatus for reproducing a magneto-optical disc to which the present invention is applied.
FIG. 3 is a schematic diagram showing a state in which transition points A, B and c of a secondary signal recorded as an offset of a recording track along its width coincide with the transition points of the primary signal recorded on the recording track.

A concrete example of reproducing a magneto-optical disc on which sync signals are recorded on the recording track and subsidiary data such as addresses are recorded on the recording track and subsidiary data such as addresses are recorded by offsetting the track itself along its width, is explained with reference to FIG. 2.

In this figure, a magneto-optical disc 10 has a spirally or concentrically extending recording track or tracks. The above mentioned subsidiary data are recorded by offsetting the track itself along its width, while sync signals and main data are recorded on the recording track as explained previously. This magneto-optical disc 10 is adapted to be driven in rotation by a spindle motor 11 at a constant linear velocity (CLV) or at a constant angular velocity (CAV).

A laser beam from a laser light source 12 for recording and/or reproduction, such as a laser diode, is collimated by a collimator lens 13 into a parallel beam which then irradiates the magneto-optical disc 10 via a beam splitter 14 and an object lens 15 arranged as a biaxial device for focusing and tracking. The reflected beam from the disc 10 is split by the beam splitter 14 and the split beam is transmitted by an optical system 16 including a ½ wavelength plate, converging lens or a cylindrical lens, so as to be incident on a polarization beam splitter 17, where the incident light beam is split into so-called P polarization and S polarization components, which are then transmitted to photodetectors 18, 19 for detecting tracking error signals, focusing error signals and magneto-optical signals (MO signals).

The outputs from the photodetectors 18, 19 are transmitted to a differential amplifier 20 where the difference between the two outputs of the photodetectors is determined in order to extract magneto-optical RF signals or MORF signals which are then transmitted from the differential amplifier 20 to a fixed terminal b of a changeover switch 22' and to an MO data detection circuit 21. It is noted that tracking error signals and focusing error signals are also detected by a four-segment device of the light receiving section of the photodetector 18, so that signals of subsidiary data, that is the RF signals recorded by track offsetting along the track width, may be produced from the high frequency components of the tracking error signals in the RF signal reproducing circuit 22. In these RF signals, which have been recorded by offsetting the track along its width and which are taken out as the high frequency components of the tracking error signals, there are contained not only clock signal components having the same frequency as that of the clocks of the main information on the recording track along the track length, but also the sync signals for predetermined recording units of the main information, such as frame sync signals. Thus, by transmitting the signals recorded by offsetting the track along its width to a PLL (phase locked loop) 23, a frame sync detection circuit or a timing generator via fixed terminal a of the changeover switch 22, clocks or various timing signals may be generated.

The PLL 23 is constituted by a phase comparator 23a, an LPF (low-pass filter) 23b, a VCO (voltage controlled oscillator) 23d and a frequency divider 23d, and operates to control the oscillation frequency of the VCO 23d so as to be equal to an integer times the frequency of the clocks contained in the RF signals recorded by offsetting the track along its length. The frequency divider 23d divides the frequency of the output of the VCO 23d to generate clocks having the same frequency as that of the clocks contained in the RF signals recorded by offsetting the recording track along its width. The clocks of the predetermined frequency from the PLL 23 are transmitted to the frame sync detection circuit or to the timing generator for capturing frame sync signals or generating various timing signals.

After completion of the capturing of the clock frequency of the PLL 23 with the use of the RF signals recorded by offsetting the track along its width, the changeover switch 22 is switched by changeover control signals from, for example, a timing generator. The phase capturing of the PLL 23 is performed by the sync signal written at the leading end of the 0'th frame contained in the MORF signals. The phase-captured clocks are transmitted to the MO data detection circuit where the main signals or data recorded on the recording tracks are detected so as to be taken out as reproduced data at a terminal 25.

When phase capturing at PLL 23 is performed by sync signals recording on the recording track, as explained previously, the signals recorded by offsetting the track along its width tend to leak into the MORF signals. This is a problem particularly since, conventionally the point of change or transition, that is the edge, of the magneto-optical signal or MO signal, recorded on the recording track, is "coincident recorded" by offsetting the track along its width to raise the phase capturing accuracy by the PLL 23.

Figure 4:
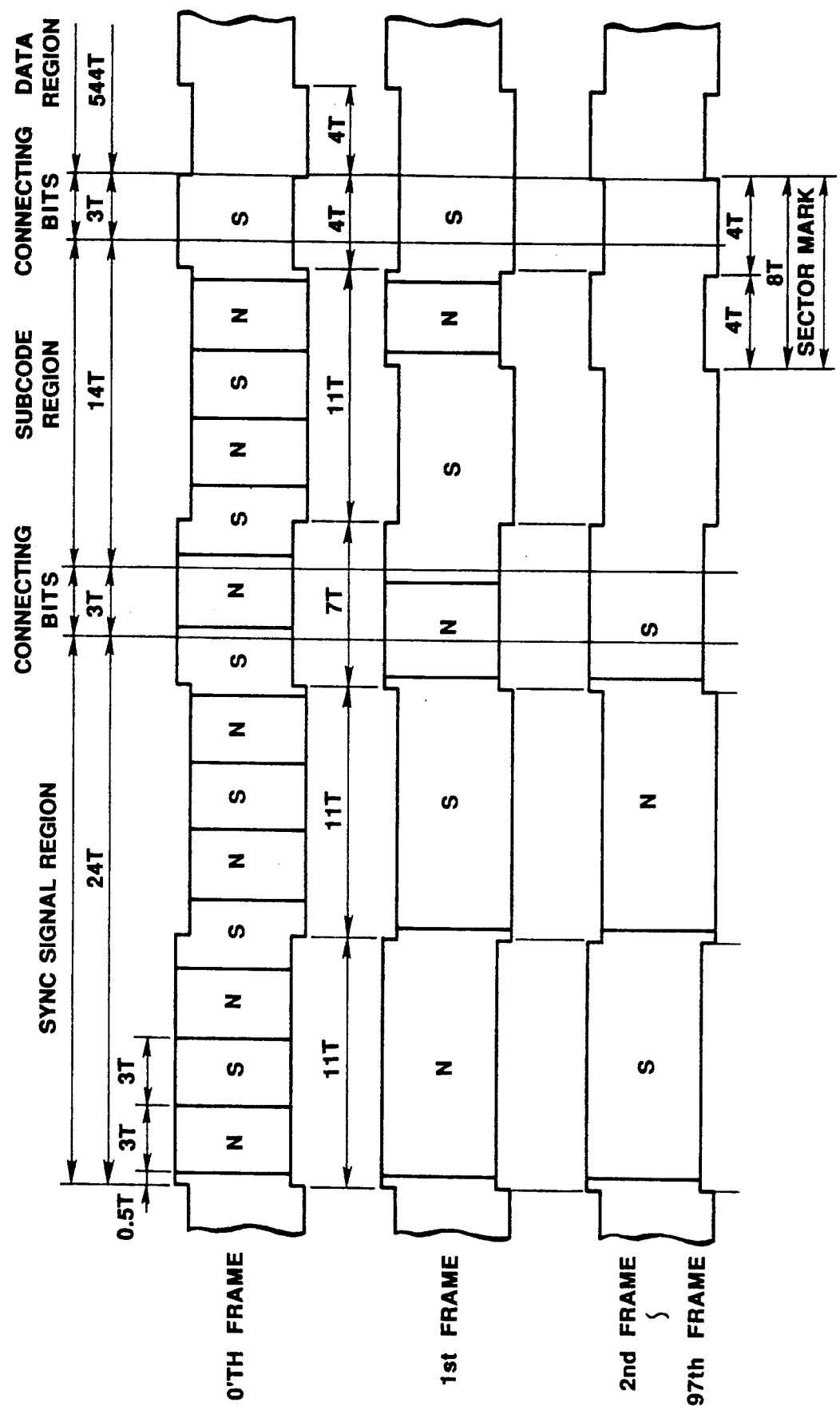
FIG. 4 is a schematic diagram showing a recording format for an information recording method according to a modified embodiment of the present invention.

Another embodiment of the data recording method of the present invention will be explained by referring to FIG. 4, which shows the recording format of the recording track of the magneto-optical disc formed in accordance with the present illustrative embodiment in conjunction with the recorded data recorded by offsetting the track along its width. As FIG. 4 shows, the phase of the signal recorded on the recording track is shifted by a unit smaller than the channel clock period, that is the channel clock bit width T, such as by 0.5T, with respect to the signal recorded by offsetting the track along its width, so that the point of transition of the signal recorded by offsetting the track along its length is not coincident with that of the signal recorded on the recording track. This enables accurate phase capturing at the PLL, as in the preceding embodiment. By so doing, the point of transition of the signal on the recording track is not coincident with, i.e., is spaced, apart from, that of the signal recorded by offsetting the track along its width. This eliminates the deleterious effects of the signal recorded by offsetting the track along its width.

The present invention is not limited to the embodiments described above. Thus the phase deviation of the signal recorded on the recording track with respect to the signals recorded by offsetting the track along its width may be set so as to be 0.1T or 0.2T. That is, the positional accuracy or deviation of the signal recorded on the recording track is on the order of ±20 ns, with the channel clock period T of 270 ns, as an example. Thus it suffices if the phase deviation of the signal recorded on the recording track with respect to the signal recorded by offsetting the track along its width is selected to be large enough as compared to this positional deviation to avoid the coincidence or overlapping of these points of transition of the two signals.

When the magneto-optical signals (MO signals) are recorded on the recording track, it has been customary to reproduce clock components from the signal previously recorded by offsetting the track along its width and to record the MO signal on the recording track with the use of these clocks. However, the MO signal recorded on the recording track is delayed with respect to the signal previously recorded by offsetting the track along its width on account of the delay introduced in the filter circuit of the PLL for clock detection or in the MO signal writing circuit. That is, since the clock phase of the MO signal on the recording track differs from the clock phase of the signal previously recorded by offsetting the track along its width, an error is likely to be produced if the main information is reproduced with the use of the clocks extracted from the signal previously recorded by offsetting the track along its width. Therefore, in order to reproduce the magneto-optical disc, it is necessary to extract clock components from the MORF signals derived from the MO signals and to reproduce the main information with the use of these clocks.

In other words, it has been necessary to provide a long preamble region on the recording track in which clock components have been written so that the clock components can be extracted sufficiently from the MO signals. According to the present invention, instead of providing a preamble region which is long enough to permit extraction of the clock components, the frequency components of the clocks are previously recorded by offsetting the track along its width, as shown in FIGS. 1 and 4, and the clock frequency of the PLL is captured by these recorded signals to enable clock phase capturing at the PLL by the sync signals written at the leading end of the 0'th frame on the recording track. This reduces the length of the preamble region as well as the PLL capturing time.

According to the present invention, as described above, the signal containing the clock components of the main information is previously recorded by offsetting the track along its width, and the sync signals for phase capture are recorded on the recording track as the MO signals with a deviation of the phase or point of transition with respect to that of the previously recorded signal. Thus, the PLL clock frequency may be previously captured by the previously recorded signals, and the PLL clock phase may be captured by the sync signals recorded on the recording track. This shortens the time required to attain PLL stabilization. In addition, since the adverse effects of the signals recorded by offsetting the track along its width on the signals recorded on the recorded track may be eliminated, more accurate clock capture may be achieved at the PLL. As compared to a system in which clocking is achieved only by the main information signals recorded on the recording track, the length of the preamble that needs to be recorded on the recording track for clock detection may be reduced. This avoids the need to reduce the data recording capacity of the recording medium.

The recording medium on which sync or address data are previously recorded by offsetting the recording track itself along its width may be mass-produced easily by a press working process making use of a master disc or a stamper.

A further embodiment of the present invention will be hereinafter explained by referring to FIGS. 5 to 7.

Figure 5:
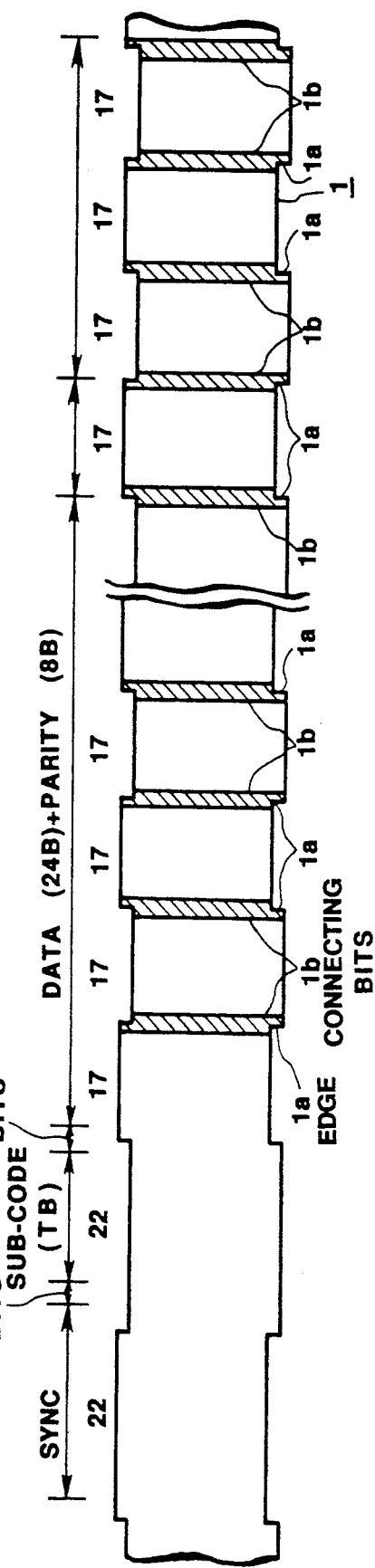
FIG. 5 is a diagrammatic view showing the state of track formation according to another modified embodiment of the present invention.
Figure 6:
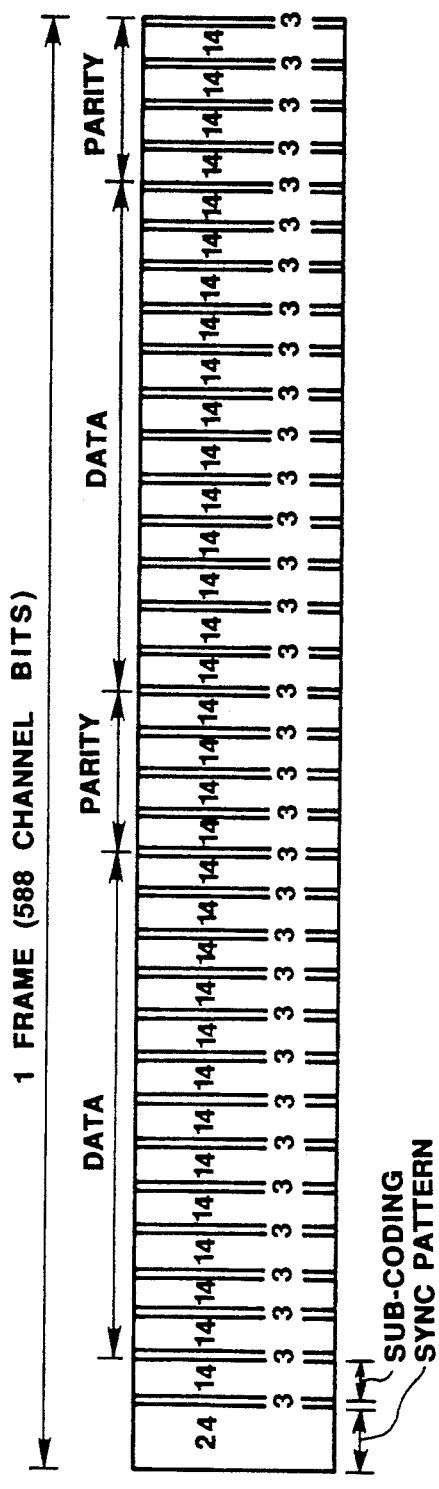
FIG. 6 is a schematic diagram showing the state of modulation by the EFM (eight-to-fourteen modulation) system.

FIG. 5 shows the state of the recording track on the magneto-optical disc prepared in accordance with the present invention. With the magneto-optical disc of the present illustrative embodiment, a vertical magnetization film exhibiting magneto-optical effects is formed on a transparent substrate. On this magneto-optical disc, a tracking guide groove or grooves are formed in a spiral or concentric pattern so as to be used as a recording track. In FIG. 5, this track is developed along a straight line. In the present embodiment, various data are previously recorded on the groove as the control information by offsetting the groove along its width at the time of preparation of the magneto-optical disc.

The recording format for the control information should be consistent with that of the compact disc (CD) adapted for recording digital audio signals or the like. That is, with the usual CD format, each block or sector as an information recording unit is constituted by 98 frames from the 0'th frame to the 97th frame. FIG. 6 illustrates the construction of each frame. Each frame has a distance equal to 588 times the channel clock period T or 588T and is provided with recording regions for frame sync signals, subcode and data inclusive of parity data. At the leading end of each frame, there are provided 24T frame sync signals and 4T sub-code signals, each followed by 3T connecting bits. In the remaining 544T, there are arrayed 32-symbol or 32-byte data and parity data which are previously modulated by the so-called EFM (eight to fourteen modulation) system.

With the data modulation by the EFM system, the original 8-bits-per-symbol data is converted into a 14-bits-per-symbol pattern, while at the same time three connecting or merging bits are introduced between the adjacent symbols so that the connecting state between the 4-bit patterns will satisfy predetermined conditions. As these three connecting bits, the four bit patterns of 000, 100, 010 and 001 are provided and selectively employed in accordance with the preceding and succeeding data. These connecting bits are inserted for the purpose of controlling the DC components of the recording signals, while there are contained no data in the connecting bits.

As FIG. 5 shows, data modulated in accordance with the EFM system consistent with the aforementioned CD format are recorded in the groove provided on the magneto-optical disc of the present illustrative embodiment. In this case, each block or sector is constituted by 100 frames of from the 0'th to the 99th frames. Of these, 98 frames (the 1st frame to the 98th frame) are reserved for recording data and the remaining 0'th and 99th frames are used as the recording regions for the block-by-block address and sync signals. Each of the 1st frame to the 98th frame is constituted by the frame sync signal region, followed by the connecting bits, the sub-code region and the connecting bits, followed in turn by data and parity consisting of 32 symbols, each symbol consisting of a 14-bit pattern and 3 connecting bits.

In the present embodiment, each groove 1 is wobbled or offset along its width so that, as FIG. 5 shows, transitions or changes occur in each groove at the points $(22T \times 2 + 17T \times 32)$ for each fame. The offset along the width at the 22T period represents the data corresponding to the frame sync signals, while the offsetting along the width at the 17T period represents the data for clock generation and synchronization. In this case, as the frame sync signals, signals consisting of two consecutive iterations of 11T transition distances are recorded, similarly to the frame sync signals for CD. Meanwhile, 11T transition distance represents the maximum transition distance of $T_{MAX}$ of the EFM system. In the 32-symbol data and parity recording region, data are recorded so that the points of transition at edges 1a of the groove 1 offset at the 17T interval will be within the recording region 1b for the connecting bits for the data and the parity data, for example, at substantially the center of the recording region 1b.

Figure 7:
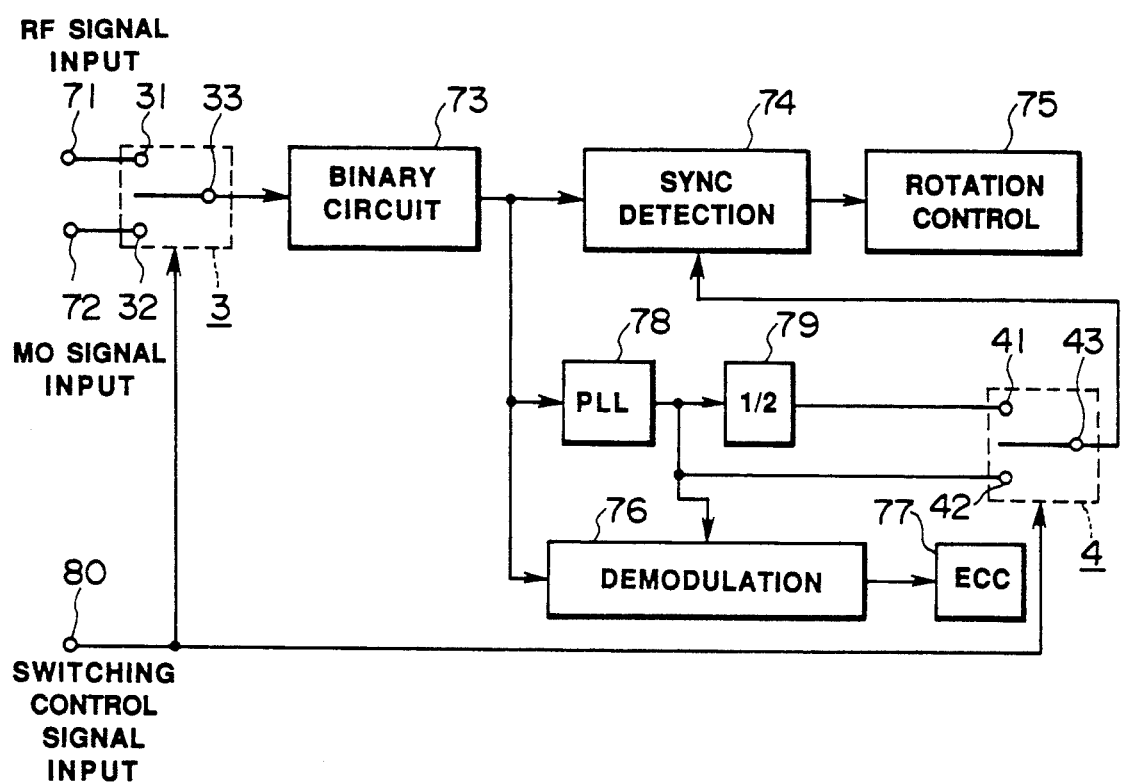
FIG. 7 is a block circuit diagram of recording/reproducing apparatus corresponding to the embodiment shown in FIG. 5.

FIG. 7 shows the construction of the recording/reproducing apparatus for reading data recorded in the thus formed groove 1. With the recording/reproducing apparatus, shown in FIG. 7, it is possible not only to reproduce the magneto-optical disc on which grooves 1 are formed, but also to reproduce a CD (compact disc) on which pits are formed as tracks or a CD-ROM having a similar format. In FIG. 7, the numeral 71 denotes a terminal to which are supplied data which are previously recorded in the form of physical changes of the track, that is, formation of pits or offsetting of the groove along its width, and which are read out as high frequency or RF signals, and the numeral 72 denotes a terminal to which MO signals previously recorded by magneto-optical effects in the groove are read out and supplied.

The signals supplied to the terminals 71 and 72 are supplied to first and second fixed contacts 31 and 32 of a changeover switch 3. The switching of the changeover switch 3 as well as a changeover switch 4 which will be explained subsequently is controlled by a switching control signal supplied to a switching control signal input terminal 80. The RF signal or the MO signal obtained at a movable contact 33 of the changeover switch 3 is supplied to a binary circuit 73 where the RF signal and the MO signals are converted into binary data of a high level signal "1" and a low level signal "0". The binary data output from the binary circuit 73 are transmitted to a sync detection circuit 74, a demodulation circuit 76 and a PLL circuit 78. The sync detection circuit 74 detects, on the basis of the clocks supplied from the PLL circuit 78, the frame sync signal recorded at the leading end of each frame and transmits the detected sync signal to apply rotational speed servo control.

The demodulating circuit 76 demodulates, on the basis of the clocks supplied from the PLL circuit 78, the data recorded in each frame, and transmits the demodulated data to an error correction circuit 77.

The PLL circuit 78 formulates, on the basis of the output data from the binary circuit 73, the clocks with the frequency of 4.3218 MHz, and transmits the output clocks to a first fixed contact 41 of the changeover switch 4 via a frequency halving circuit 79 while transmitting the same output clocks directly to a second fixed contact 42 of the changeover switch 4. The signal produced at movable contact 43 of the changeover switch 4 is transmitted to sync detection circuit 74, while the output clock of the PLL circuit 78 is directly supplied to demodulating circuit 76. During accessing, that is, recording and reproducing, of the magneto-optical disc, on which the groove is previously formed, the switching control signal produced at the switching control signal input terminal 80 is such as will cause the movable contacts 33 and 43 of the changeover switches 3 and 4 to be connected to the first fixed contacts 31 and 41. During reproduction of the recorded data on the magneto-optical disc on which the groove is previously formed, that is, the MO signals, the switching control signal is such as will cause the movable contacts 32 and 42 of the changeover switches 3 and 4 to be connected to the second fixed contacts 32 and 42. During reproduction of the CD on which the pits are formed previously, the switching control signal is such as will cause the changeover switches 3 and 4 to be connected to the first fixed contact 31 and the second fixed contact 42, respectively. That is, the output 4.3218 Mhz clocks of the PLL circuit 78 are supplied, after frequency halving, to the sync detection circuit 74, so that the 22T frame sync signals recorded by offsetting the groove along its width may be detected at sync detection circuit 74 to ensure synchronization of disc rotation. The 22T frame sync signals mean that these signals have a duration of 22T, which is twice the transition distance 11T of the frame sync signal of the CD format. Under these conditions, data modulated by the EFM system are recorded as the MO signals.

In FIG. 7, the circuit of the recording system is omitted for clarity. In this case, data are recorded in the data and parity recording region of each frame so that, as FIG. 5 shows, the points of transition or edges of the groove 1, which are formed by offsetting the groove at the 17T interval, will be situated within the recording regions 1b for the connecting bits for the data and parity data.

For reproduction of the magneto-optical disc, after detecting the 22T frame sync signals previously recorded by offsetting the groove along its width and head accessing operation, as at the time of recording, the movable contacts 33 and 43 of the changeover switches 3 and 4 are connected to the second fixed contacts 32 and 42, by the aforementioned switching control signals. This enables detecting the 11T frame sync signals, recorded as the MO signals, for reproduction. In this case, the 11T frame sync signals of a duration equal to half of 22T may be detected, since the output 4.3218 MHz clocks of the PLL circuit 78 are directly supplied to the sync detection circuit 74.

For reproducing the CD on which pits are formed previously, the changeover switches 3 and 4 are set to the sides of the first fixed contact 31 and to the second fixed contact 42, by the aforementioned changeover control signal, respectively, so that the 4.3218 MHz output clocks of the PLL circuit 78 are directly supplied to the sync detection circuit 74 for detecting the 11T frame sync signals, formed as pits, for reproducing the CD.

In this manner, with the present illustrative embodiment, the circuitry of the recording/reproducing apparatus may be used not only with a magneto-optical disc on which the grooves are formed previously, but with a disc on which the pits are formed previously. In this case, the frame sync signals, recorded by offsetting the groove along its width, have a period of 22T, which is an integer multiple of the 11T period of the frame sync signals modulated in accordance with the EFM system, so that sync detection may be detected easily by the switching of the frequency divider 79.

On the other hand, in the data and parity recording region of each frame, formed in the groove of the magneto-optical disc, the groove is offset at a 17T interval corresponding to one symbol, so that the record data may be searched on the symbol-by-symbol or byte-by-byte basis. Since the period of the frame sync signal 22T is longer than the 17T period of the wobbling or offsetting along its width, the frame sync signal may be detected accurately. Since the connecting bits for the data and parity recording region of each frame are matched to the points of groove transition along its width, data may be reproduced satisfactorily during reproduction of the recorded data or MO signals without any adverse effects of the points of groove transition along its width. That is, the connecting bits control the DC components and are free of any information and the 14-bit data region is not coincident with the points of transition of the groove along its width, so that the reproduced data are not affected by the offsetting of the groove along its width.

Although data recording is made within the groove of the magneto-optical disc in the above illustrative embodiment, data recording may also be made in the lands defined between the adjacent grooves. In addition, the points of transition or edges may be coincident with one of the edges of the 3-bit connecting region instead of at substantially the center of the 3-bit connecting region.

The present invention may also be applied to a variety of recording media, such as, for example, an organic dyestuff base optical disc, write once type disc, overwritable disc, optical card or a magneto-optical card, in addition to the magneto-optical disc of the preceding embodiments.

We claim:

1. A method of recording information comprising the steps of:
   pre-forming on an optical recording medium a recording track which is elongate in a length direction and has offsets at intervals in a width direction perpendicular to the length direction;
   providing a data clock signal at a predetermined bit rate;
   recording a first information signal along the length direction of the recording track, there being successive bit portions of the first information signal corresponding to an integral number of bits of the data clock signal and points of transition between said successive bit portions of the first information signal;
   wherein the offsets of the recording track constitute points of transition of a second information signal, the second information signal being recorded on the optical recording medium along said length direction at the time of performing said pre-forming step;
   and further comprising the step of arranging the points of transition of the first information signal during recording so that said points of transition of the first information signal are respectively spaced apart from the points of transition of the second information signal by a unit smaller than a bit of the data clock signal.

2. A method according to claim 1 wherein a portion of the first information signal has a predetermined pattern for synchronization of the first information signal.

3. A method according to claim 1 wherein the first information signal is recorded in accordance with a recording clock of a given duration and so that there is a phase shift between the respective points of transition of the first and second information signals, the phase shift being shorter than said given duration.

4. A method according to claim 1 comprising the step of forming the recording track as a spiral.

5. A method according to claim 1 comprising the step of forming the recording track as concentric circles.

6. A method of recording information comprising the steps of:
   providing a data clock signal at a predetermined bit rate;
   pre-forming on an optical recording medium a recording track which is elongate in a length direction and has offsets at intervals in a width direction perpendicular to the length direction, in which the intervals correspond to an integral number of bits of the data clock signal
   recording a first information signal along the length direction of the recording track;
   effecting modulation of the first information signal prior to recording thereof and employing connecting bits in the modulation at regions spaced apart from each other so as to conform to a predetermined modulation rule;
   wherein the offsets of the recording track constitute points of transition of a second information signal, the second information signal being recorded on the optical recording medium along said length direction at the time of performing said step of pre-forming;
   and further comprising the step of arranging said spaced apart regions of the first information signal during the step of recording so that said points of transition of the first information signal respectively include the points of transition of the second information signal and the phase of the first information signal is shifted by a unit smaller than a bit of the data clock signal.

7. A method according to claim 6 comprising the step of forming the recording track as a spiral.

8. A method according to claim 6 comprising the step of forming the recording track as concentric circles.

* * * * *

UNITED STATES PATENT AND TRADEMARK OFFICE
CERTIFICATE OF CORRECTION

PATENT NO. : 5,311,491
DATED : May 10, 1994
INVENTOR(S) : Tamotsu Yamagami and Yoichiro Sako It is certified that error appears in the above-indentified patent and that said Letters Patent is hereby corrected as shown below:

In the Abstract, line 4, change "prere-" to --pre-re---

Col. 1, line 11, change "prerecorded" to --pre-recorded--
      line 21, change "pregroove" to --pre-groove--
      line 26, change "pregroove" to --pre-groove--
      line 57, change "Mo" to --MO--
Col. 2, line 7, change "prerecorded" to --pre-recorded--
      line 39, change "preforming" to --pre-forming--
      line 54, change "preforming"to --pre-forming--
Col. 3, line 5, change "preformed" to --pre-formed--
Col. 4, line 19, change "c" to --C--
      lines 54 & 55, change "pregroove or pregrooves. The pregroove or pregrooves" to --pre-groove or pre-grooves. The pre-groove or pre-grooves--
Col. 6, line 19, after "1st" insert --to--
      line 33, change "40" to --40T--
Col. 7, line 49, change "23d" first occurrence, to --23c--
      line 51, change "23d" to --23c--
      line 55, change "23d" to --23c--

UNITED STATES PATENT AND TRADEMARK OFFICE
CERTIFICATE OF CORRECTION

PATENT NO. : 5,311,491
DATED : May 10, 1994
INVENTOR(S) : Tamotsu Yamagami and Yoichiro Sako It is certified that error appears in the above-indentified patent and that said Letters Patent is hereby corrected as shown below:

Col. 8, line 34, after "spaced" delete ","
Col. 10, line 5, change "subcode" to --sub-code--

Col. 14, line 17, after "signal" insert --;--

Signed and Sealed this

Eleventh Day of July, 1995

Attest:

BRUCE LEHMAN

Attesting Officer

Commissioner of Patents and Trademarks